United States Patent
McKitterick (10) Patent No.: US 8,391,553 B2
(45) Date of Patent: *Mar. 5, 2013

(54) SYSTEMS AND METHODS FOR USING AN EVIDENCE GRID TO ELIMINATE AMBIGUITIES IN AN INTERFEROMETRIC RADAR

(75) Inventor: John B. McKitterick, Columbia, MD (US)

(73) Assignee: Honeywell International Inc., Morristown, NJ (US)

( * ) Notice: Subject to any disclaimer, the term of this patent is extended or adjusted under 35 U.S.C. 154(b) by 337 days.

This patent is subject to a terminal disclaimer.

(21) Appl. No.: 12/817,918

(22) Filed: Jun. 17, 2010

(65) Prior Publication Data

US 2010/0271255 A1    Oct. 28, 2010

Related U.S. Application Data

(63) Continuation-in-part of application No. 12/051,801, filed on Mar. 19, 2008, now Pat. No. 8,311,695.

(51) Int. Cl.
*G06K 9/00* (2006.01)
*G01S 13/00* (2006.01)
(52) U.S. Cl. ......... 382/103; 382/291; 342/25 B
(58) Field of Classification Search .......... 382/100, 382/103, 106–107, 155, 168, 181, 206–207, 382/232, 254, 274, 276, 291, 305, 312, 328; 342/25, 176, 174, 25 F, 25 B, 54; 707/690
See application file for complete search history.

(56) References Cited

U.S. PATENT DOCUMENTS

| 4,975,704 | A  | * | 12/1990 | Gabriel et al. | 342/25 C |
| 7,142,150 | B2 | * | 11/2006 | Thackray | 342/54 |
| 7,417,586 | B2 | * | 8/2008 | Thomas et al. | 342/174 |
| 7,609,200 | B1 | * | 10/2009 | Woodell et al. | 342/176 |
| 7,783,612 | B2 | * | 8/2010 | Houk et al. | 707/690 |
| 2008/0007450 | A1 | * | 1/2008 | Yedidia et al. | 342/25 F |
| 2009/0238473 | A1 | * | 9/2009 | McKitterick | 382/228 |

FOREIGN PATENT DOCUMENTS

| WO | 9507473 A1 | 3/1995 |
| WO | 2007028932 | 3/2007 |

OTHER PUBLICATIONS

Goshi, D S et al, Recent advances in 94 GHz FMCW imaging radar development, Microwave Symposium Digest, 2009. MTT '09. IEEE MTT-S International, pp. 77-80.
Kulich et al., "Robust Data Fusion With Occupancy Grid", "IEEE Transactions on Systems, Man and Cybernetics; Part C: Applications and Reviews", Feb. 1, 2005, pp. 106-115, vol. 35, No. 1, Publisher: IEEE Service Center.
Linzmeier et al., "A Pedestrian Detection System Based on Thermopile and Radar Sensor Data Fusion", "Information Fusion, 2005 7th International Conference on Philadelphia, PA", Jul. 25, 2005, pp. 1272-1279, vol. 2, Publisher: IEEE.

* cited by examiner

*Primary Examiner* — Seyed Azarian
(74) *Attorney, Agent, or Firm* — Lowe Graham Jones PLLC (57) ABSTRACT

A system includes an Interferometric radar that transmits a first detection signal over a first spatial region and a second detection signal over a second spatial region. The second region has a first sub-region in common with the first region. The system further includes a processing device that assigns a first occupancy value to a first cell in an evidence grid. The first cell represents the first sub-region, and the first occupancy value characterizes whether an object has been detected by the first detection signal as being present in the first sub-region. The processing device calculates, based on the first and second detection signals, the probability that the first occupancy value accurately characterizes the presence of the object in the first sub-region, and generates a data representation of the first sub-region based on the probability calculation.

20 Claims, 10 Drawing Sheets

SYSTEMS AND METHODS FOR USING AN EVIDENCE GRID TO ELIMINATE AMBIGUITIES IN AN INTERFEROMETRIC RADAR

PRIORITY CLAIM

This application is a Continuation-in-Part of U.S. patent application Ser. No. 12/051,801 filed Mar. 19, 2008, the contents of which are hereby incorporated by reference.

BACKGROUND OF THE INVENTION

The ability of a radar to precisely locate a target is limited by the beamwidth of the radar, since a radar return can come from anywhere in the cone formed by the beam. By making the beam as narrow as possible, the target can be located more precisely. However, physics dictates that in order to make the beam narrower, the physical size of the antenna must correspondingly increase. Thus, to precisely locate a target with a radar requires a large antenna.

One way to escape from this physics-induced tradeoff is to use Interferometric methods, in which two or more radar receivers are used instead of the normal one. These receivers are placed a distance apart, and by comparing the differences in phase between the received signals, it is possible to obtain a much more accurate location of a target than with a single receiver. If there are enough receivers, it may be possible to localize the target without ambiguity. However, if we use only two receivers, or in certain geometries with more than two receivers, physics again limits the applicability of this approach. Because the phase can be measured only modulo $2\pi$, the location of the target cannot be determined uniquely because of phase ambiguity. As a result, the target can be in any of a small number of discrete locations, each contained within the radar beam, and each located more precisely than is possible without the interferometry. The tradeoff with the Interferometric approach is between the precision with which we can locate the target, the number of receivers (and antennas required), and the introduction of a number of "ghost" targets. From a single radar return and using two receivers, there is no way to differentiate the true target from the ghost targets that arise from the phase ambiguities. In order to differentiate between the true target and the ghost targets, multiple radar returns must be utilized.

The use of two or more receivers does have an additional drawback, in that the antenna design becomes more complicated. At worst, two or more separate antennas will be required; at best, one single antenna may be shared by the two or more receivers. However, with interferometry it is possible to achieve performance with two antennas (and two receivers) that is much superior to that achieved with a single receiver and a single antenna of twice the size.

Figure 1:
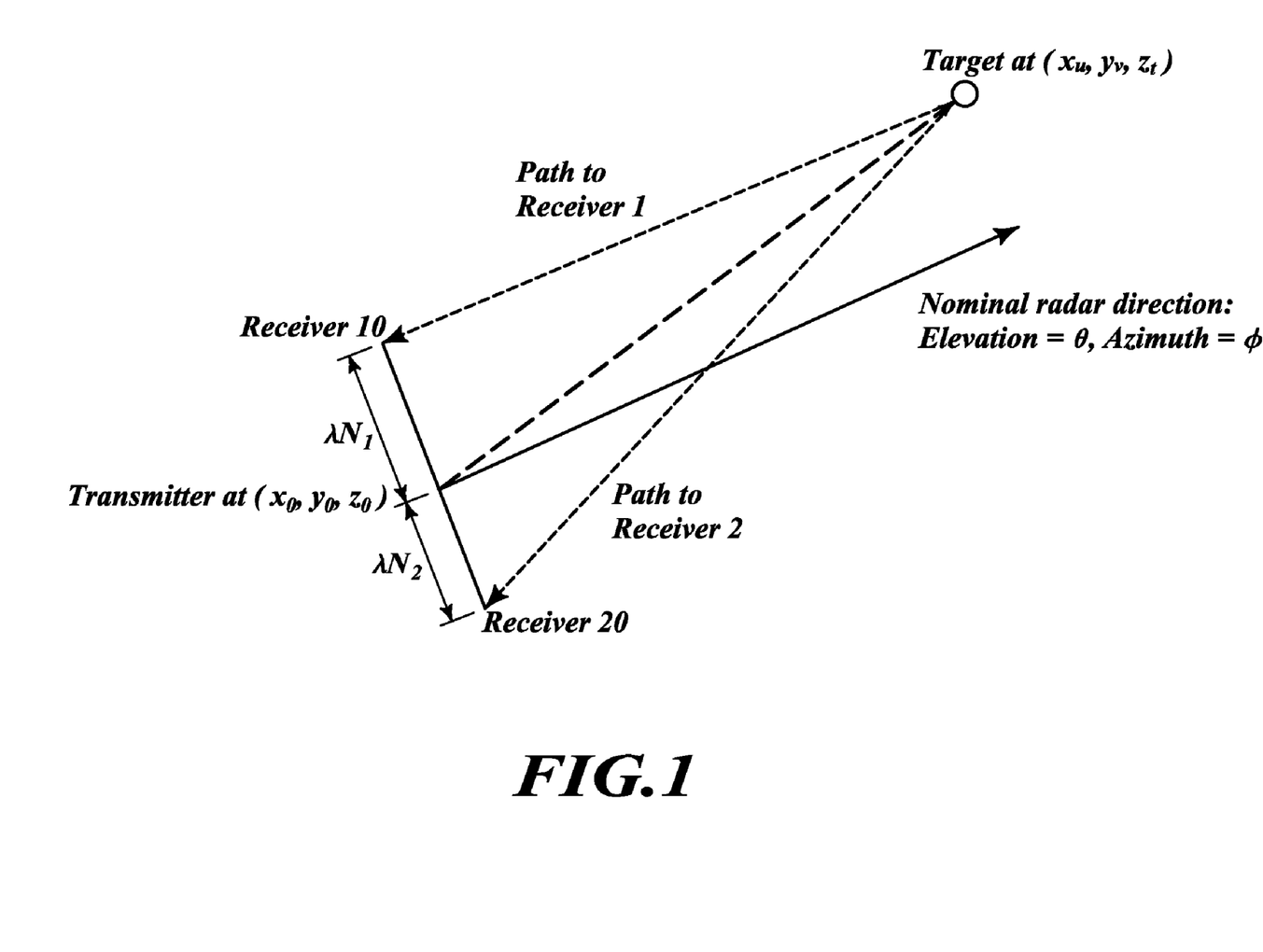
FIG. 1 illustrates a geometric relationship of signals produced/received by an Interferometric radar.

As shown in FIG. 1 the basic geometry of an Interferometric radar with two receivers 10, 20 is shown. Other cases, with more receivers or different alignments, may be used. The two receivers 10, 20 are displaced from a single transmitter by distances of $\lambda N_1$ and $\lambda N_2$, with $\lambda$ being the wavelength of the radar. The signal paths from the transmitter to the target and back to the two receivers 10, 20 have slightly different paths. If R is the distance from the transmitter to the receiver, then the length of the signal path to the receiver 10 is given, to first order in $\lambda N_1/R$ by:

$$d_1 = 2R + \lambda N_1 \frac{(x_t - x_0)\sin\theta - (z_t - z_0)\cos\theta}{R} \quad (1)$$

the difference in path length for the two receivers 10, 20 is then $$\Delta = \lambda(N_1 + N_2)\frac{(x_t - x_0)\sin\theta - (z_t - z_0)\cos\theta}{R} \quad (2)$$

and the difference in phase of signals arriving at the two receivers 10, 20 is just $$\Phi = 2\pi(N_1 + N_2)\frac{(x_t - x_0)\sin\theta - (z_t - z_0)\cos\theta}{R} \quad (3)$$

Let $\Delta\theta$ and $\Delta\Phi$ be the difference in elevation and azimuth, respectively, between the target position and the direction of the radar beam. Then the phase difference is $$\Phi = 2\pi(N_1+N_2)\cos(\Delta\varnothing)\sin(\Delta\theta) \approx 2\pi(N_1+N_2)\Delta\theta \quad (4)$$

where we assume that the target is inside the radar beam and the small angle approximation is valid. $|\Delta\theta|$ must be less than the vertical radar half-beamwidth.

Suppose now a measurement has been made, resulting in a measured phase difference of $\Phi_m \pm \delta\Phi$. The measured phase difference is ambiguous. A measurement of $\Phi_m$ means only that the true phase difference is $\Phi_m + 2n\pi$, where n is any integer. Hence, solving Eq. (4) for $\Delta\theta$, the following is determined:

$$\Delta\theta = \frac{\Phi_m + \delta\Phi + 2n\pi}{2\pi(N_1 + N_2)} \quad (5)$$

The possible values for n are limited only by the requirement that $|\Delta\theta|$ be less than the radar beamwidth. Only one of the possible values of n represents the target; the other values are ghost targets.

Noteworthy is the dependence of the calculation of $\Delta\theta$ on $\delta\Phi$, as this determines how accurately one can localize the target. Increasing the separation between the two receivers 10, 20 increases the accuracy, but at a cost of increasing the number of ghosts possible. As an example, consider an example of a 94 GHz Interferometric radar to obtain some indication of the increase in capability. For this radar, assume that the beamwidth in the vertical direction is 4°, and the nominal separation between the two receivers 10, 20 is 37 wavelengths. Assume also that the expected resolution of the phase measurement is ±5°; then the nominal resolution of the Interferometric radar will be ±0.02°. There will be as many as three ghosts within the 4° beam, in addition to the real target. The resulting resolution is 20 times better using interferometry. Note that to achieve this kind of accuracy with a single receiver would require an antenna 20 times larger.

SUMMARY OF THE INVENTION

In an embodiment of the invention, a system includes an Interferometric radar that transmits a first detection signal over a first spatial region and a second detection signal over a second spatial region. The second region has a first sub-region in common with the first region. The system further includes a processing device that assigns a first occupancy value to a first cell in an evidence grid. The first cell represents the first sub-region, and the first occupancy value characterizes whether an object has been detected by the first detection signal as being present in the first sub-region. The processing device calculates, based on the first and second detection signals, the probability that the first occupancy value accurately characterizes the presence of the object in the first sub-region, and generates a data representation of the first sub-region based on the probability calculation.

The combination of the evidence grid with the Interferometric radar provides a powerful tool with many applications. The evidence grid provides a means to eliminate the ambiguities (i.e., ghosts) associated with the use of interferometry using only two receivers, while the capabilities of the Interferometric radar provides sensor data to the evidence grid that is far superior to that from a non-Interferometric radar.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

An evidence grid at its most basic is a collection of points and a measure of occupancy at each of these points. Typically, the collection of points forms a uniform grid in three-dimensions, but the uniformity is not required. The measure of occupancy of a cell in the three-dimensional grid can be interpreted as the probability that the cell is occupied. A question addressed herein is how to arrange the occupancies of the cells in the evidence grid so as to match as well as possible the measurements corresponding to the sensed environment.

An approach includes asking the related question: given a proposed evidence grid, with probabilities of occupancy assumed for each cell, what is the probability that (modeled) measurements of the cells in this evidence grid will match (actual) measurements of the real world? If we can make that calculation as a function of the occupancies of the cells, then we can turn the problem of how to fill out the occupancies of the cells in the evidence grid into a related optimization problem, to find the occupancies of the cells that maximize the probability that those (modeled) measurements of the evidence grid match the (actual) measurements of the real world.

Figure 2:
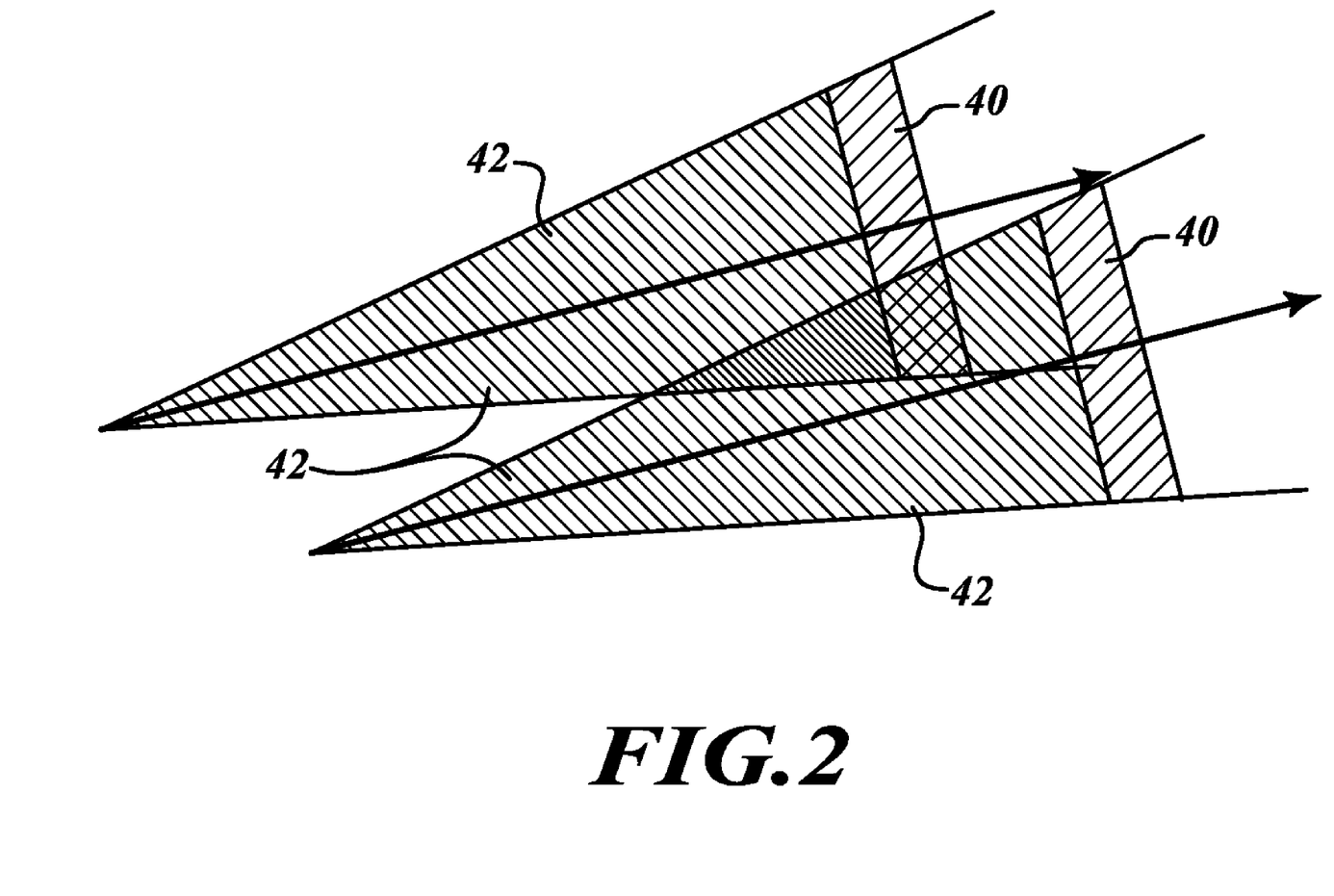
FIG. 2 illustrates two different radar measurements.

The evidence grid is a method of accumulating knowledge about a volume to determine what parts of the area are occupied by obstacles. The volume is divided up into cells, and the results of the measurements are used to determine whether the cells are occupied or not. An important part of this determination is the use of negative inferencing, so that the lack of a return from a radar measurement can be used as evidence that some part of the volume is unoccupied. As shown in FIG. 2, areas 40 show the volumes in space corresponding to radar bins in which there were positive radar returns. At least some portion of these volumes must be occupied in order to have a positive return. Areas 42 correspond to those radar bins in which there was no radar return below a threshold; hence, those areas are unoccupied. Where the area 40 which overlaps the area 42, the only part of the area 40 which can be occupied is the part of the area 40 which does not intersect the area 42. By doing this, one can narrow down which parts of the volume are occupied, and so increase the resolution of the measurements beyond what would be possible with a single radar measurement.

Figure 3:
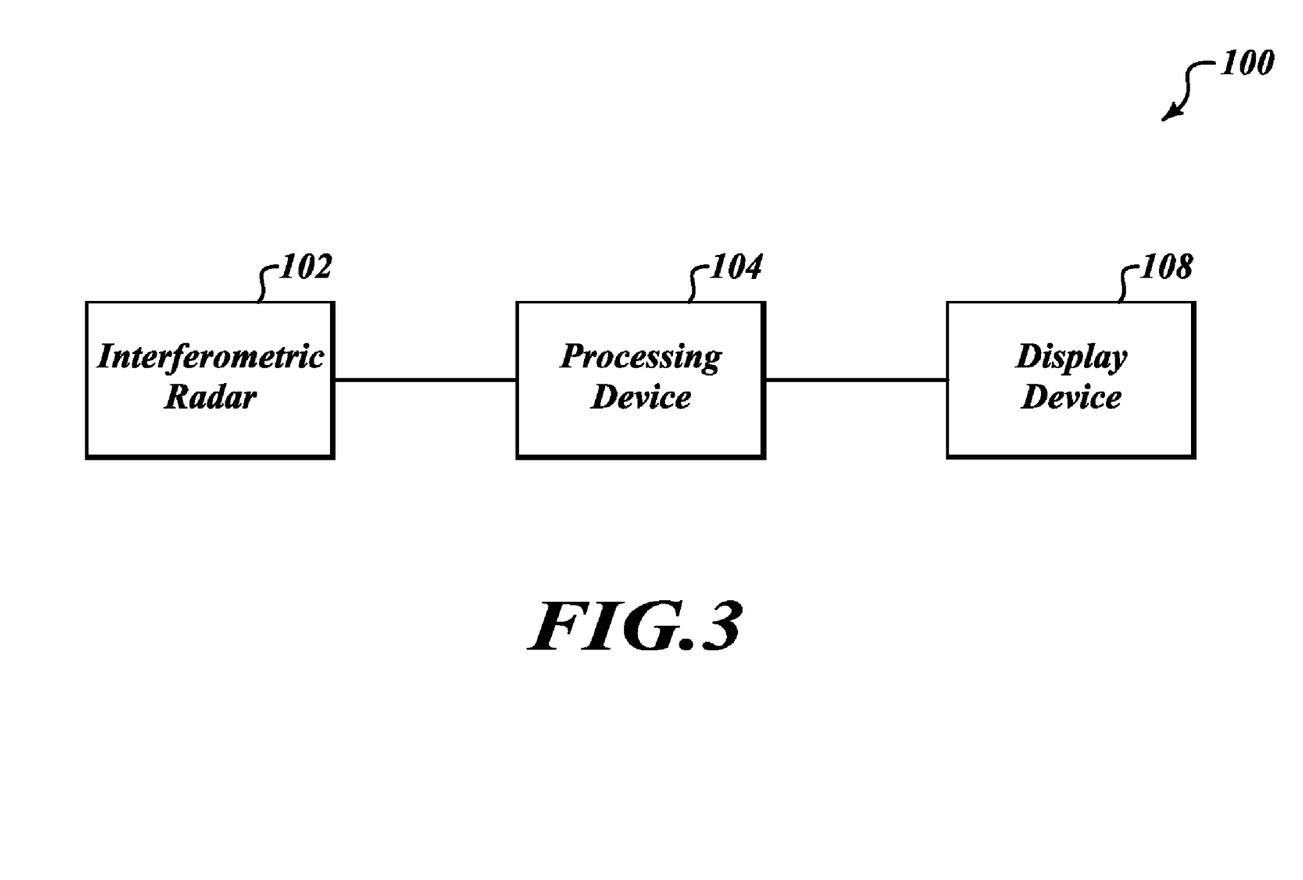
FIG. 3 illustrates a system formed in accordance with to an embodiment of the invention.

FIG. 3 illustrates a system 100 according to an embodiment of the invention. The system 100 includes an Interferometric radar device 102, a processing device 104, such as a computer, microprocessor or other appropriate computational device, and an optional display device 108, such as a synthetic vision system. The Interferometric radar device 102 transmits multiple simultaneous and/or sequential sensory (detection) signals in a manner, and of a configuration. The display device 108 displays a representation of the terrain or other environment surveyed by the Interferometric radar device 102.

Figure 4:
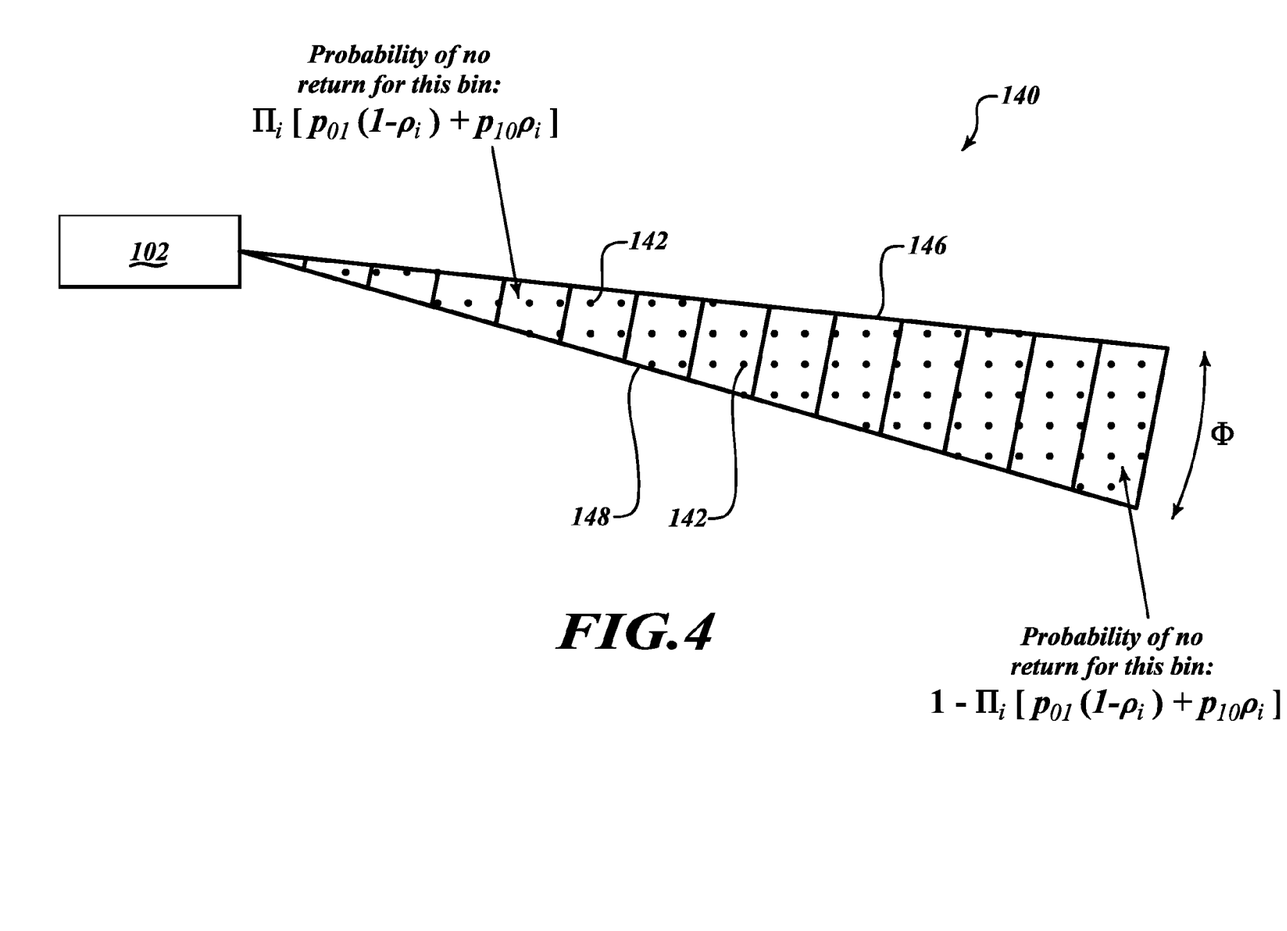
FIG. 4 a spatial region that can be modeled by an evidence grid according to an embodiment of the invention.

Referring now to FIG. 4, consider a measurement made by the Interferometric radar device 102 of a spatial region 140 that can be modeled by an evidence grid. Center points 142 of cells of the evidence grid representing sub-regions of the region 140 are shown superimposed on the region 140. Additionally, the region 140 is illustrated as being divided into multiple bins 146, each of which includes one or more such cells and is a respective distance from the Interferometric radar device 102. The region 140 has some angular width $\Phi$ (i.e., may be conical in configuration), within which a beam transmitted by the Interferometric radar device 102 will, with some probability, reflect off of a volume in space represented in the evidence grid by an occupied cell. For simplicity, $p_{11}$ is the probability that a volume in space represented by an occupied cell reflects the beam, and can, but need not, make the assumption that this probability is independent both of the distance from the Interferometric radar device 102 (up to the maximum range of the Interferometric radar device), and of the angle from the central axis of the Interferometric radar device (up to the angular width of the beam).

Similarly, $p_{00}$ is the probability that a volume in space represented by an unoccupied cell does not reflect the beam. From these, we can easily obtain the probability that a volume in space represented by an unoccupied cell reflects the beam (a false positive response from the Interferometric radar device) as $p_{10}=1-p_{00}$, and also the probability that a volume in space represented by an occupied cell does not reflect the beam (a false negative response) as $p_{01}=1-p_{11}$.

Now suppose one of the actual radar measurements results in a first detection at some bin 146 at a distance r from the Interferometric radar device 102. The radar measurement is actually a measurement not just at the distance r, but also returns information about bins 148 that are at a distance less than r from the Interferometric radar device 102. Hence, the probability that a theoretical radar measurement of an evidence grid is the same as a measurement of the actual sensed environment can be calculated as follows. The probability that a single cell makes a reflection is considered. Letting $\rho_i$ be the probability that the ith cell in the evidence grid is occupied, then the probability that the ith cell produces a reflection is:

$$p_i = p_{11}\rho_i + p_{10}(1-\rho_i) \qquad (6)$$

and the probability that the ith cell does not produce a reflection is:

$$\tilde{p}_i = 1 - p_i = p_{01}\rho_i + p_{00}(1-\rho_i) \qquad (7)$$

For each range bin up to but not including the range bin within which an object is detected, the probability that there is no return is simply the probability that each of the cells in that range bin do not reflect the beam, which may be expressed as the product of the individual probabilities, $\Pi_i \tilde{p}_i$. For the range bin 146 in which there was an object detection, the probability that there is a reflection given the state of the evidence grid is obtained by calculating the probability that there was no detection and subtracting from 1, or $1 - \Pi_i \tilde{p}_i$. This simply states that in order to detect a reflection, at least one of the cells must have reflected the beam. The net result for the probability that a theoretical radar measurement of the evidence grid matches the actual radar measurement of the sensed environment is thus $$P_k = \Pi_{ik} \tilde{p}_{ik} [1 - \Pi_{jk} \tilde{p}_{jk}] \qquad (8)$$

where the subscript ik runs in the kth radar beam over all of the cells lying in the range bin(s) 148 closer to the Interferometric radar device 102 than the range bin in which there was an object detection, and the subscript jk runs in the kth radar beam over all of the cells lying in the range bin in which there was an object detection. Then, the processing device 104 can calculate the probability that all of the theoretical radar measurements made on the evidence grid matches the actual measurements made by multiple beams transmitted by the Interferometric radar device 102 as $$\beta = \Pi_k P_k \qquad (9)$$

The goal is to find the occupancies $\rho_i$ which maximize $\beta$. In so doing, the occupancies that are most likely to match the measurements of the actual sensed environment are found.

The product in Eq. (9) is rearranged so that it is more transparent. In particular, the dependence of $\beta$ on the occupancy of a single cell is as follows:

$$\beta = \{\Pi_k \tilde{p}_i \Pi_{k'}[1-\Pi_{j'k'}\tilde{p}_{j'k'}]\} \cdot [\text{terms independent of } \rho_i] = P(\rho_i) \cdot [\text{terms independent of } \rho_i] \qquad (10)$$

where the product k is over the radar beams for which the ith cell is in the beam but from which there is no return in the corresponding range bin, and the product over k' is over the radar beams for which the ith cell is in the range bin for which there was a detection. This expression splits the dependence on $\rho_i$ into two parts. The first part is a measure of how often the cell is not seen by a radar beam. The second part is a measure of how well the current evidence grid supports the actual measured detections.

A few observations about the result in Eq. (10) follow. First, if a cell never appears in a detected range bin, then the second product in Eq. (10) (over k') is empty and the occupancy of the cell can be set to zero. In other words, if the cell is never in a detection range bin of any radar beam, then its occupancy can be set to zero. Second, if the first product in Eq. (10) is empty, then the cell has never been not seen by a radar beam. In this case, $\rho_i$ can be set to 1.

To solve for the optimum occupancies for those cells which cannot be trivially set to 0 or 1, one may examine more closely the quantity inside the braces in Eq. (10), $P(\rho_i)$. An embodiment seeks the maximum of $\beta$ with respect to the $\rho_i$, subject to the constraint that $0 \leq \rho_i \leq 1$ (since $\rho_i$ is a probability of occupancy).

The maximum of $\beta$ is attained when one of the following conditions is met for each cell (note that this optimization is a constrained optimization, since $0 \leq \rho_i \leq 1$):

$$\partial P(\rho_i)/\partial \rho_i = 0, \; 0 < \rho_i < 1$$

$$\partial P(\rho_i)/\partial \rho_i > 0, \; \rho_i = 1$$

$$\partial P(\rho_i)/\partial \rho_i < 0, \; \rho_i = 0 \qquad (11)$$

Solving these equations for the optimum point may be done in a conventional manner, such as using, for example, a steepest-descent method. Each of the calculations discussed above herein may be performed completely or partially by the processing device 104.

Figure 5:
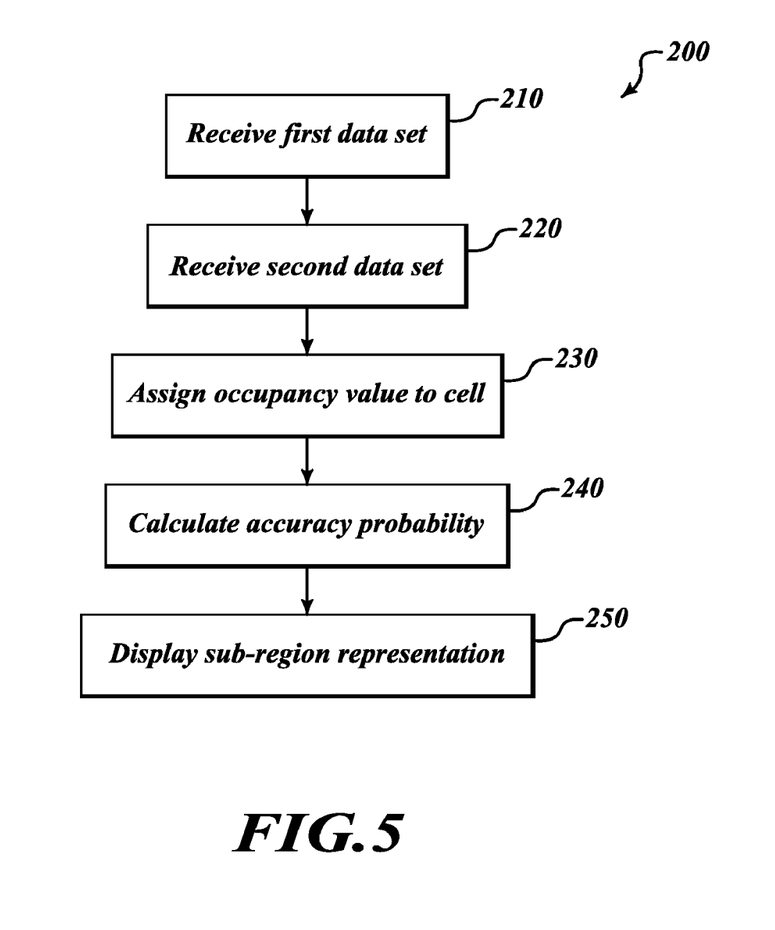
FIG. 5 illustrates a process according to an embodiment of the invention.

FIG. 5 illustrates a process 200 according to an embodiment of the invention. The process 200 is illustrated as a set of operations shown as discrete blocks. The process 200 may be implemented in any suitable hardware, software, firmware, or combination thereof. As such the process 200 may be implemented in computer-executable instructions that can be stored on a computer-readable medium and/or transferred from one computer, such as a server, to a second computer or other electronic device via a communications medium. The order in which the operations are described is not to be necessarily construed as a limitation.

At a block 210, a first data set is received corresponding to a first detection signal transmitted over a first spatial region. For example, the processing device 104 may receive data corresponding to a first measurement made of a first geographic area of interest by the Interferometric radar device 102.

At a block 220, a second data set is received corresponding to a second detection signal transmitted over a second spatial region. The second region may have a first sub-region in common with the first region. For example, the processing device 104 may receive data corresponding to a second measurement made of a second geographic area of interest by the Interferometric radar device 102. The second geographic area may be the same as or partially overlap the first geographic area.

At a block 230, based on the first data set, a first occupancy value is assigned to a first cell in an evidence grid. The first cell may represent the first sub-region. The first occupancy value characterizes whether an object has been detected by the first detection signal as being present in the first sub-region. For example, the processing device 104 may generate an evidence grid corresponding to the first geographic area and assign occupancy values (i.e., occupied/unoccupied) to one or more of the cells in the grid based on the presence or absence of reflecting objects detected in the first geographic area.

At a block 240, based on the first and second data sets, the probability that the first occupancy value accurately characterizes the presence of the object in the first sub-region is calculated. For example, the processing device 104 may perform the optimum cell occupancy calculations described above herein.

At a block 250, a representation of the first sub-region is displayed based on the probability calculation. For example, after performing the optimum cell occupancy calculations, the processing device 104 may generate a displayable model of the surveyed geographical regions to the display device 108.

Figure 6:
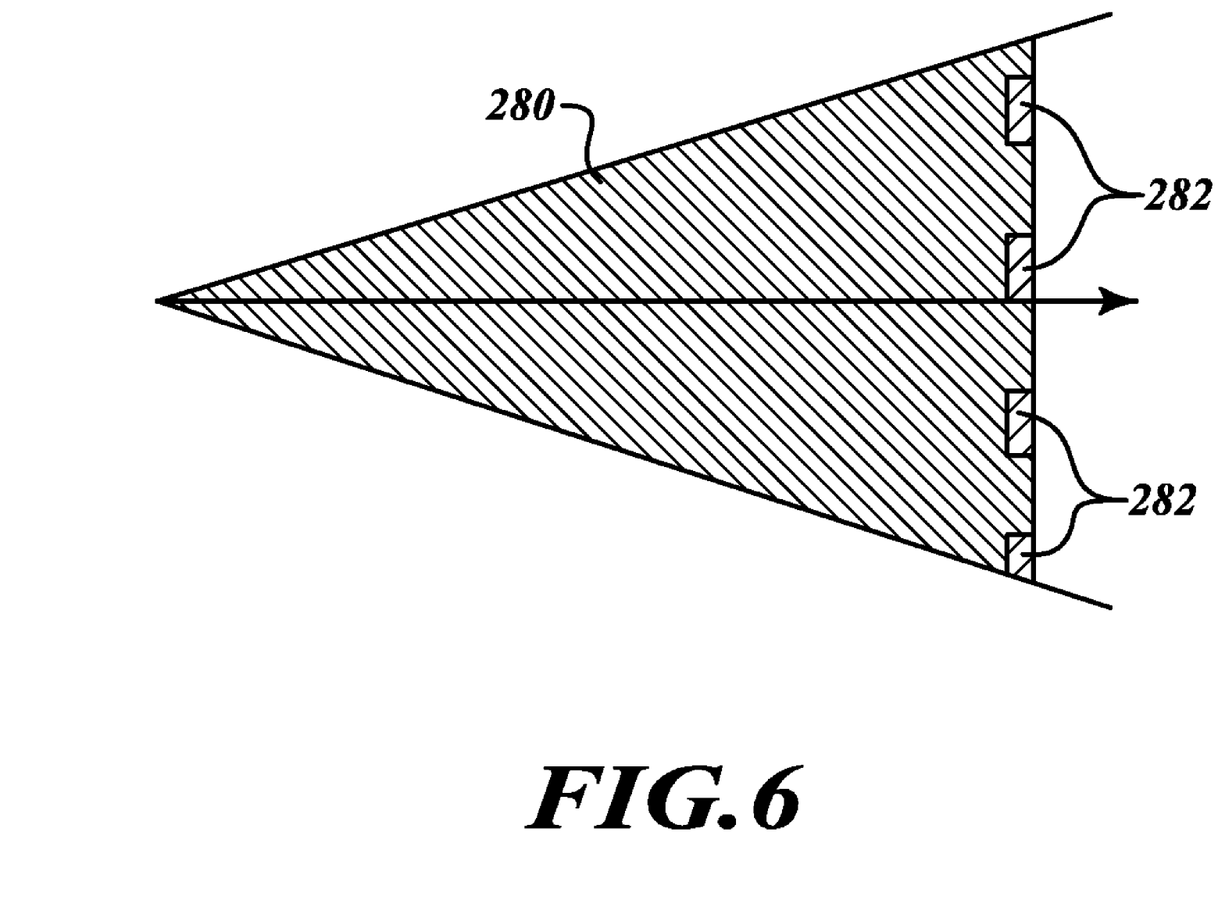
FIG. 6 shows target results of a single Interferometric radar signal.

The evidence grid eliminates the ghost targets produced by the Interferometric radar device 102. Consider a single radar return with Interferometric ghosts, as depicted in FIG. 6, where regions 282 correspond to the target and ghosts, and the region 280 corresponds to no radar return at all. From this single return it is determined which of the regions 282 contains the target. All that is known is that there is at least one radar reflector in the combination of all the regions 282. But this is all that is ever known about the volumes from which there are a positive detection, e.g., the regions 282 in FIG. 2. The use of interferometry results in a disjoint but significantly smaller volume associated with a positive detection as compared to non-Interferometric radar signal. And so the evidence grid techniques enable one to combine different radar measurements to narrow down the location of targets.

Figure 7:
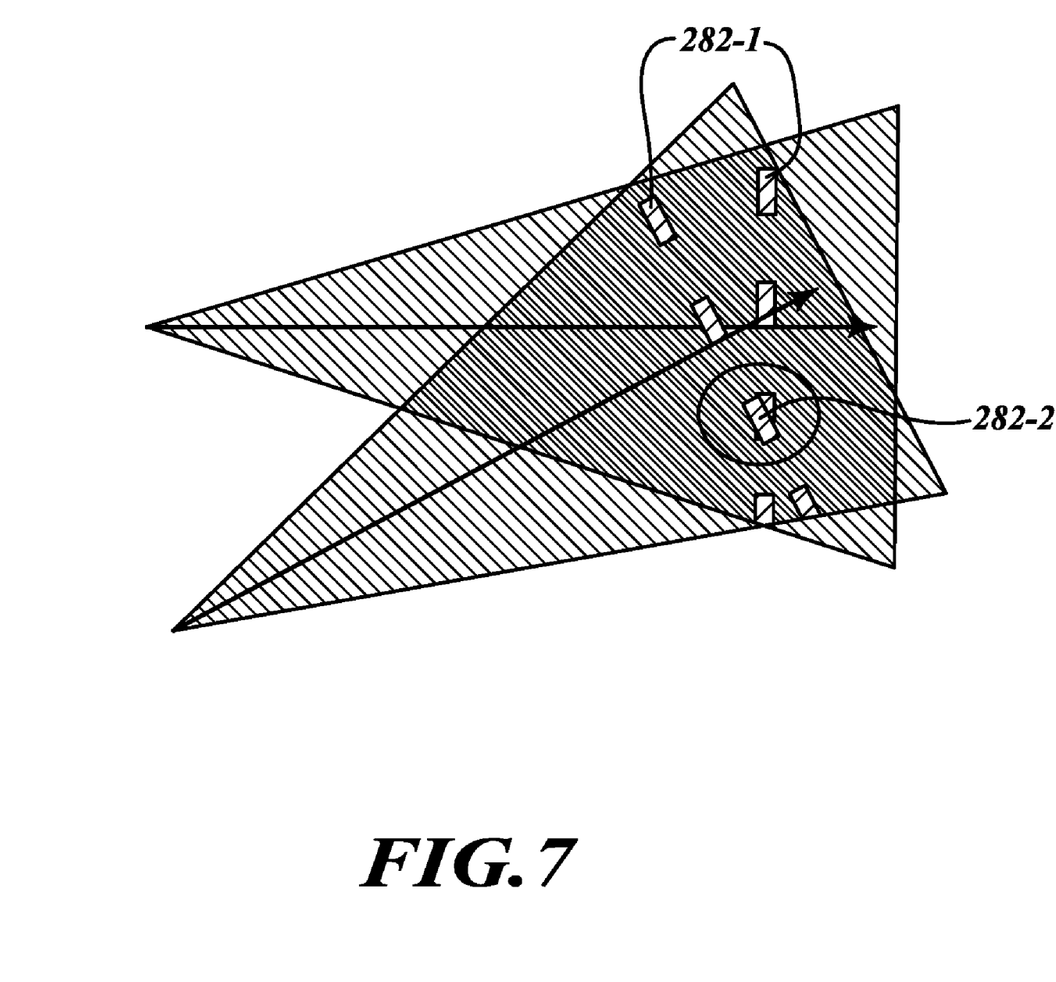
FIG. 7 shows a combined result of Interferometric radar signals using the present invention.

FIG. 7 shows an example of how combining two Interferometric radar measurements can easily eliminate ghost detections and determine where the target is. The ghost 282-1 are determined because they don't occupy the same location in space across the multiple radar scans. However, the target 292-2 does.

From Eqs. (1-4) it is clear that rotating the radar in either elevation or in azimuth, without changing the position of the radar, will not provide any change in the location of the ghosts, at least to first order in the angles between the target location and the nominal beam direction, assuming that the beamwidth of the radar is small enough in both directions that first order is a good approximation. However, this is true only as long as the target remains within the beam. If one were to change the elevation of the radar just enough that the target is no longer in the beam, any of the ghost locations that lie within the new beam will be quickly identified as ghosts.

In one example, an aircraft is traveling at 100 km/hr, 50 m above a flat plane with a cable initially located 1500 m in front of it. The radar, with a range limitation of 2048 m and a bin size of 1 m, takes a frame of data each 0.1 second. Each frame of data consists of a sweep in azimuth from $-15°$ to $+15°$ in 370 steps at a fixed elevation. The elevation is stepped from $-3°$ to $+3°$ in $1°$ steps. Radar data from this flight is fed into an evidence grid, with a cell size of 4×4 m (horizontal) and 2 m (vertical). The vertical cell size of 2 m limits the vertical resolution to 2 m.

Figure 8:
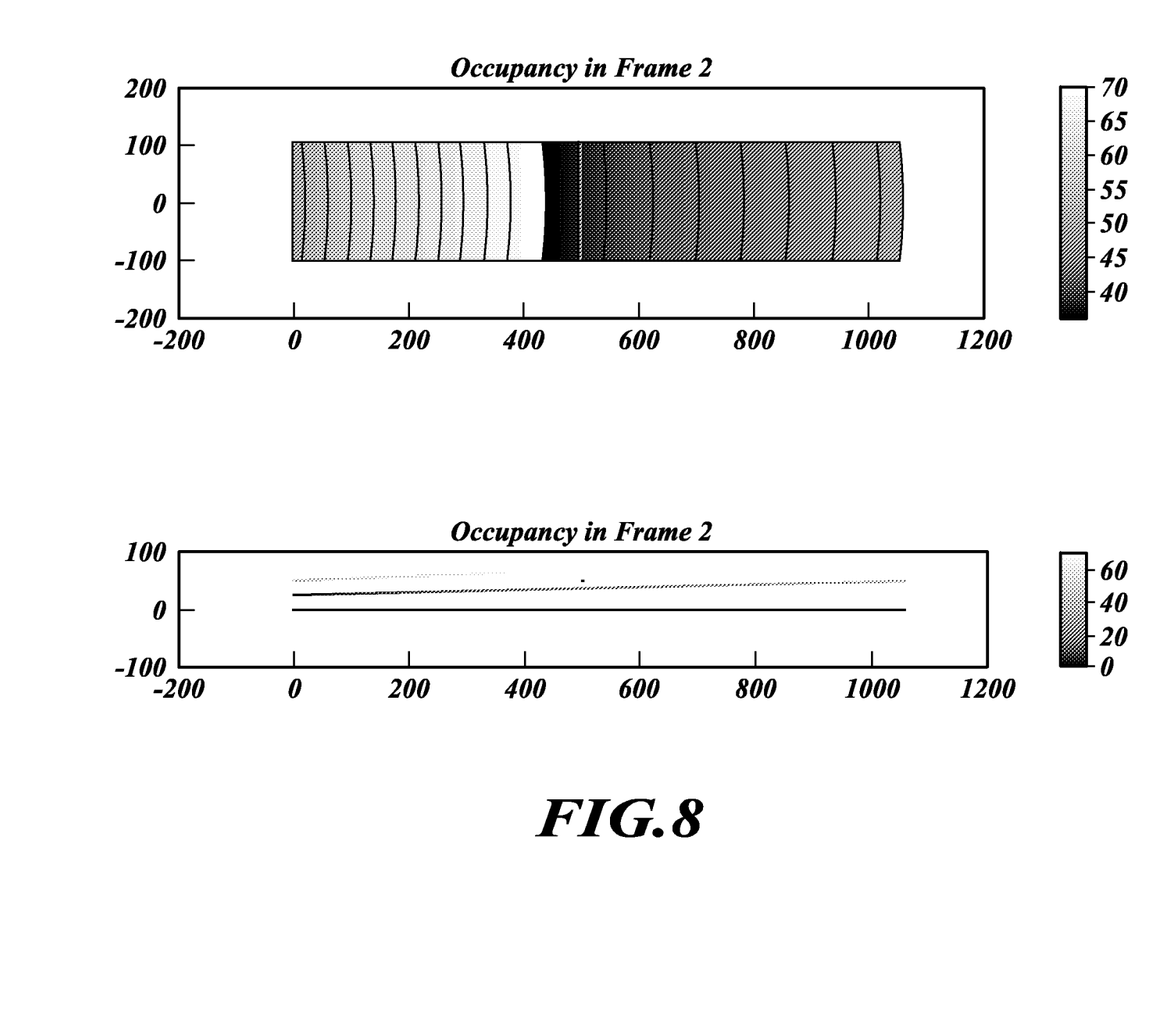
FIGS. 8-10 show output of an Interferometric radar after different numbers of frames of data.
Figure 9:
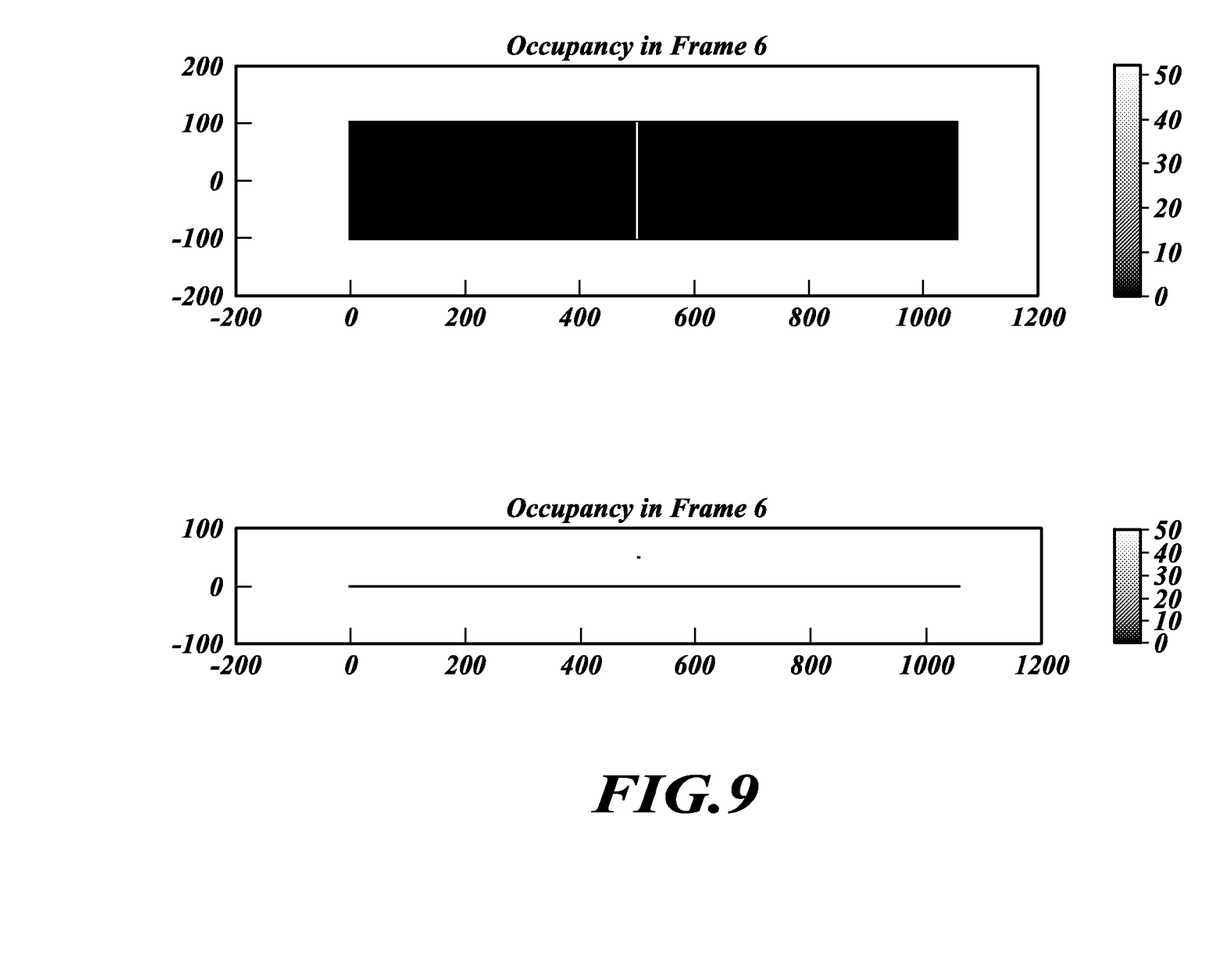

FIG. 8 shows an example output of the evidence grid for the Interferometric radar 102 after the first 3 frames of data have been analyzed. Since the elevations for these 3 frames are $-3°$, $-2°$, and $-1°$, the targets are within the beam for all three frames. (The ground is one target, a flat plane at an elevation of 0; the cable is the second target, at x=500 in FIG. 8.) Consequently, the ghosts cannot be eliminated and show up clearly. As the elevation is stepped to higher values, the ghosts are eliminated. By the time that the seventh frame of data has been processed by the evidence grid, all ghosts have been eliminated, as shown in FIG. 9, with only the flat ground plane and the cable remaining. The increased resolution in the vertical axis available with the Interferometric radar leads to a dramatic improvement in the ability of the evidence grid to model the scene.

In one embodiment, the elevation of the radar is fixed, as might be the case for an approach to a runway. Or the range of stepping of elevation might not be large enough to ensure that the target is not in the beam at some elevation. In these cases, the elimination of the ghosts cannot be done through elevation stepping, as above, but rather through the forward motion of the aircraft.

From Eq. (4), the locations of the target and ghosts, as obtained by the Interferometric radar are as follows:

$$x_t(n) = x_0 + R\cos(\theta + \Delta\theta) \quad (12)$$

$$= x_0 + R\cos\left(\theta + \frac{\Phi \pm \delta\Phi + 2n\pi}{2\pi(N_1 + N_2)}\right)$$

$$= x_0 + R\cos\left(\theta + \frac{\Phi}{2\pi(N_1 + N_2)}\right)\cos\left(\frac{n \pm \frac{\delta\Phi}{2\pi}}{(N_1 + N_2)}\right) -$$

$$R\sin\left(\theta + \frac{\Phi}{2\pi(N_1 + N_2)}\right)\sin\left(\frac{n \pm \frac{\delta\Phi}{2\pi}}{(N_1 + N_2)}\right)$$

$$= x_0 + (x_t - x_0)\cos\left(\frac{n \pm \frac{\delta\Phi}{2\pi}}{(N_1 + N_2)}\right) -$$

$$(z_t - z_0)\sin\left(\frac{n \pm \frac{\delta\Phi}{2\pi}}{(N_1 + N_2)}\right)$$

And similarly for the z-component:

$$z_t(n) = z_0 + (z_t - z_0)\cos\left(\frac{n \pm \frac{\delta\Phi}{2\pi}}{(N_1 + N_2)}\right) + (x_1 - x_0)\sin\left(\frac{n \pm \frac{\delta\Phi}{2\pi}}{(N_1 + N_2)}\right) \quad (13)$$

In these equations, n=0 represents the true target; the ghosts occur for non-zero n. The y-component is, to first order, independent of the phase measurement and will be henceforth ignored. The only permissible values of n are those that lie within the original beamwidth of the radar, and if it is assumed that the vertical beamwidth of the radar is less than 6 degrees, then the permissible values of n are such that $$\frac{n}{N_1 + N_2} \ll 1.$$

It is then calculated how the ghosts move as the position of the radar changes, to first order in $$\frac{n}{N_1 + N_2}:$$

$$\Delta x_t(n) = \frac{n \pm \frac{\delta\Phi}{2\pi}}{N_1 + N_2}\Delta z_0 \quad (14)$$

$$\Delta z_t(n) = -\frac{n \pm \frac{\delta\Phi}{2\pi}}{N_1 + N_2}\Delta x_0$$

where $x_t(n)$ and $z_t(n)$ are the components of the position of the nth order ghost. The zeroth order ghost is the target. If the radar is moving in the x-direction, then all ghosts are identified when the radar has moved a distance of $$\Delta x \sim (x_t - x_0)\frac{2\delta\Phi}{2\pi + \delta\Phi} + G_z\frac{(N_1 + N_2)}{1 + \frac{\delta\Phi}{2\pi}} \quad (15)$$

where $G_z$ is the size of the evidence grid cell in the z-dimension. Thus, using the evidence grid, a ghost is separated from the real image of an object initially 2 kilometers distant simply by moving as little as 55 meters towards the object, if the phase difference is measured to within ±5 degrees.

Figure 10:
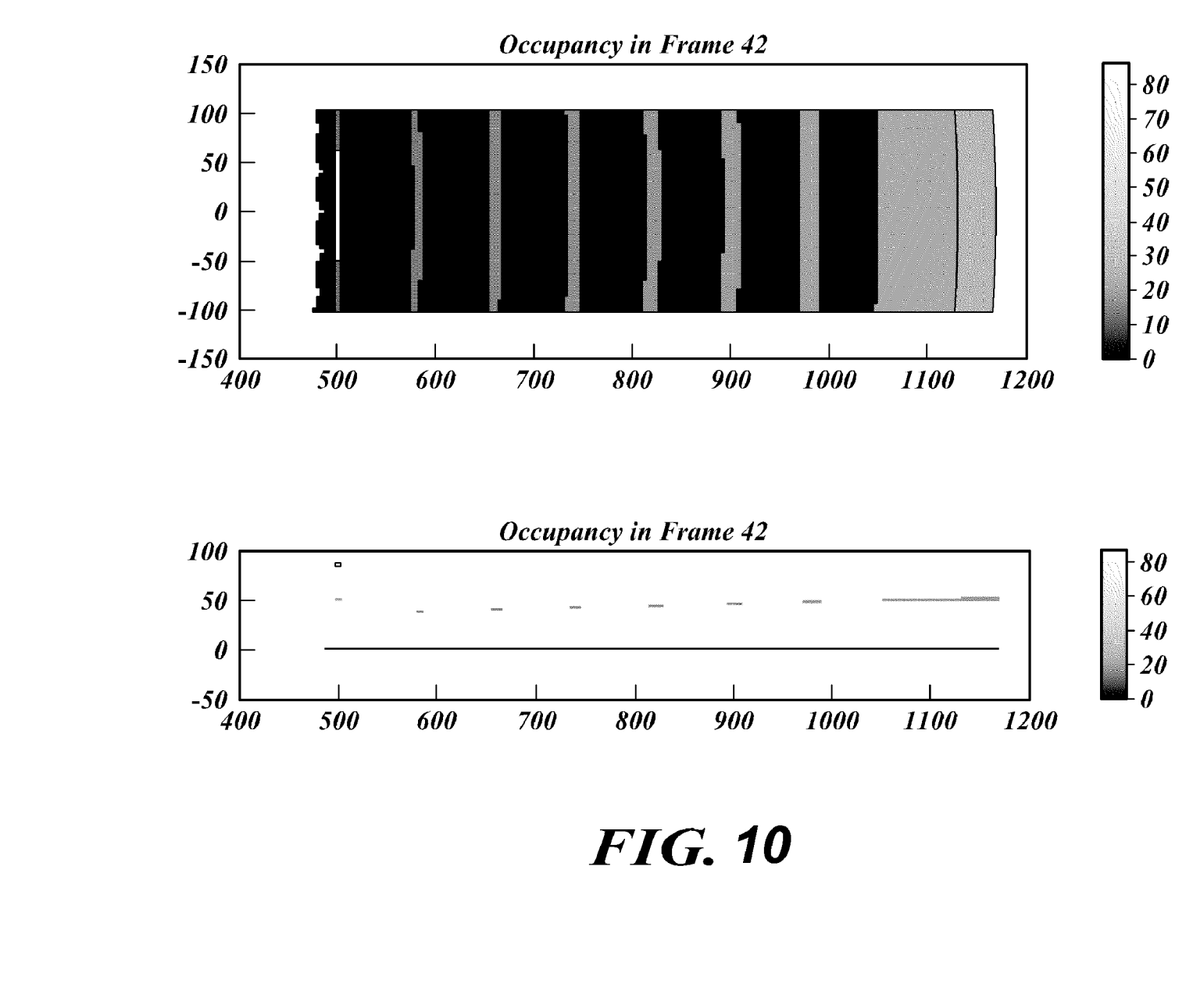

The results of a simulation with a constant elevation are shown in FIG. 10. In this case, the ghosts are eliminated only by the forward motion of the aircraft. Since the vertical dimension of the evidence grid cell is 2 m, and since the distance from the initial position of the aircraft to the cable is 1500 m, from Eq. (15) it is estimated that the ghosts arising from the cable will disappear after the aircraft moves 122 m towards the cable, after 4.4 seconds and 44 frames of data. FIG. 10 shows the last remnants of the ghosts of the cable after 4.2 seconds, just before they disappear, and after 44 frames of data have been taken, the cable ghosts have disappeared completely. Ghosts associated with the ground plane are also disappearing in a similar manner at a similar rate.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   a) receiving a first data set corresponding to a first detection signal transmitted over a first spatial region;
   b) receiving a second data set corresponding to a second detection signal transmitted over a second spatial region, the second region having a first sub-region in common with the first region, wherein the first and second data set are radar reflections produced by an Interferometric radar;
   c) based on the first data set, assigning a first occupancy value to a first cell in an evidence grid, the first cell representing the first sub-region, the first occupancy value characterizing whether an object has been detected by the first detection signal as being present in the first sub-region;
   d) calculating, based on the first and second data sets, the probability that the first occupancy value accurately characterizes the presence of the object in the first sub-region; and
   e) displaying a representation of the first sub-region based on the probability calculation.

2. The method of claim 1, wherein the evidence grid comprises a three-dimensional grid.

3. The method of claim 1, further comprising repeating a)-d), wherein calculating comprises eliminating ghost radar returns after a plurality of repetitions of a)-d).

4. The method of claim 1, wherein calculating the probability comprises calculating the probability that the first sub-region represented by the first cell reflects at least one of the plurality of detection signals.

5. The method of claim 4, wherein calculating the probability further comprises calculating the probability that the first sub-region represented by the first cell does not reflect at least one of the plurality of detection signals.

6. The method of claim 5, wherein:
   each of the first and second spatial regions comprises a respective plurality of volumetric bins, each said bin comprising at least one sub-region, the first sub-region being located in at least one of the bins, each sub-region being represented by a corresponding cell in the evidence grid; and
   calculating the probability further comprises calculating a first probability that each sub-region within a first bin of the first spatial region does not reflect at least one of the plurality of detection signals and a second probability that each sub-region within a first bin of the second spatial region does not reflect at least one of the plurality of detection signals.

7. The method of claim 6, wherein calculating the probability further comprises calculating a third probability that each sub-region within a second bin of the first spatial region reflects at least one of the plurality of detection signals and a fourth probability that each sub-region within a second bin of the second spatial region does not reflect at least one of the plurality of detection signals.

8. The method of claim 7, wherein calculating the probability further comprises:
   calculating a first product of the first probability corresponding to at least one bin of the first spatial region and the third probability corresponding to at least one bin of the first spatial region; and
   calculating a second product of the second probability corresponding to at least one bin of the second spatial region and the fourth probability corresponding to at least one bin of the second spatial region.

9. The method of claim 8, wherein calculating the probability further comprises calculating a third product of the first and second products.

10. The method of claim 9, wherein calculating the probability further comprises calculating the maximum of the third product.

11. A system comprising:
    an Interferometric radar device configured to transmit a first detection signal over a first spatial region, receive any radar reflections associated with the first detection signal, transmit a second detection signal over a second spatial region and receive any radar reflections associated with the second detection signal, the second region having a first sub-region in common with the first region;
    a processing device configured to:
    a) assign a first occupancy value to a first cell in an evidence grid, the first cell representing the first sub-region, the first occupancy value characterizing whether an object has been detected by the first detection signal as being present in the first sub-region,
    b) calculate, based on the first and second detection signals, the probability that the first occupancy value accurately characterizes the presence of the object in the first sub-region, and
    c) generate a data representation of the first sub-region based on the probability calculation; and
    an ouput device configured to produce an output based on the generated data representation.

12. The system of claim 11, wherein the at least one sensor device comprises a radar-type device and a device type other than a radar-type device.

13. The system of claim 11, wherein the processing device eliminates ghost radar returns after the Interferometric radar device sends more detection signals and receives associated reflections and the processing device repeats a)-c) based on the additional reflections received.

14. The system of claim 11, wherein the processing device is further configured to calculate the probability that the first sub-region represented by the first cell reflects at least one of the plurality of detection signals.

15. The system of claim 14, wherein the processing device is further configured to calculate the probability that the first sub-region represented by the first cell does not reflect at least one of the plurality of detection signals.

16. The system of claim 15, wherein:
    each of the first and second spatial regions comprises a respective plurality of volumetric bins, each said bin comprising at least one sub-region, the first sub-region being located in at least one of the bins, each sub-region being represented by a corresponding cell in the evidence grid; and
    the processing device is further configured to calculate a first probability that each sub-region within a first bin of the first spatial region does not reflect at least one of the plurality of detection signals and a second probability that each sub-region within a first bin of the second spatial region does not reflect at least one of the plurality of detection signals.

17. The system of claim 16, wherein the processing device is further configured to calculate a third probability that each sub-region within a second bin of the first spatial region reflects at least one of the plurality of detection signals and a fourth probability that each sub-region within a second bin of the second spatial region does not reflect at least one of the plurality of detection signals.

18. The system of claim 17, wherein the processing device is further configured to calculate:
    calculate a first product of the first probability corresponding to at least one bin of the first spatial region and the third probability corresponding to at least one bin of the first spatial region; and
    calculate a second product of the second probability corresponding to at least one bin of the second spatial region and the fourth probability corresponding to at least one bin of the second spatial region.

19. The system of claim 18, wherein the processing device is further configured to calculate a third product of the first and second products.

20. The system of claim 19, wherein the processing device is further configured to calculate the maximum of the third product.

* * * * *